UNITED STATES PATENT OFFICE.

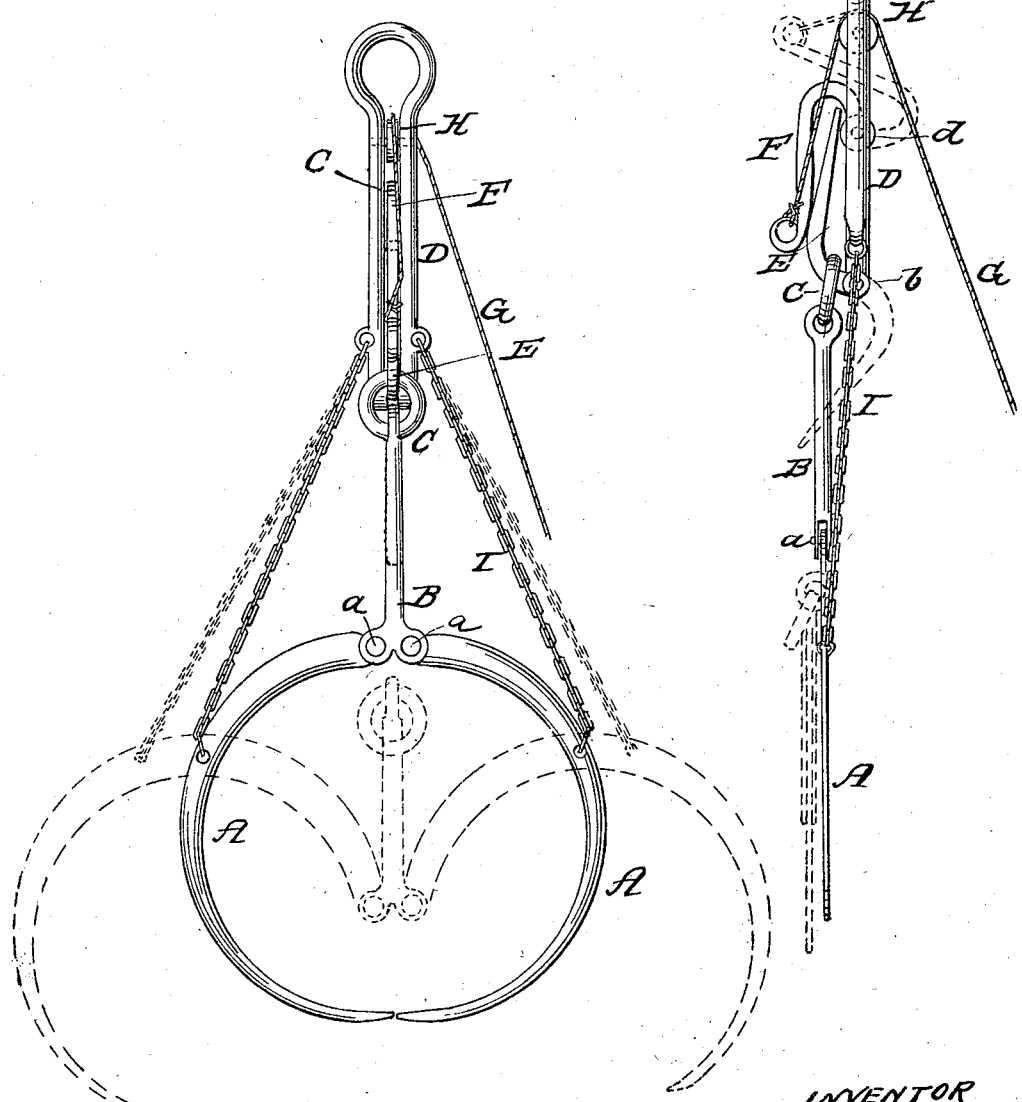

AARON KRATZ, OF PLUMSTEADVILLE, PENNSYLVANIA.

IMPROVEMENT IN HORSE HAY-HOOKS.

Specification forming part of Letters Patent No. 40,628, dated November 17, 1863.

*To all whom it may concern:*

Be it known that I, AARON KRATZ, of Plumsteadville, in the county of Bucks and State of Pennsylvania, have invented a new and Improved Horse Hay-Hook; and I do hereby declare that the following is a full, clear, and exact description of the same, reference being had to the accompanying drawings, making a part of this specification, in which—

Figure 1 is a front view of my invention; Fig. 2, an edge view of the same.

Similar letters of reference indicate corresponding parts in the two figures.

This invention relates to a new and improved implement or device for elevating hay, straw, &c., in barns and depositing it in mows.

The invention consists in the employment or use of two hooks pivoted to the lower end of a tang, the upper end of which is provided with an eye or ring to receive a hook, the latter being pivoted in the lower end of a bar which has a catch or fastening fitted in it to hold or retain the hook, said bar being connected to the hooks by chains, and all arranged in such a manner as to form a very simple and efficient device for the purpose specified.

To enable those skilled in the art to fully understand and construct my invention, I will proceed to describe it.

A A represent two hooks, which are curved about in semicircular form, and are pivoted at their upper ends to the lower end of a rod or bar, B, as shown at *a a*. The upper end of the rod or bar B has a ring, C, fitted in it, as shown in both figures.

D is a bar, in the lower end of which a hook, E, is secured by a pivot, *b*. This bar D has a slot, *c*, in it extending its whole length, and in this slot, at a point near its center, there is secured by a pivot, *d*, a catch or fastening, F, which is of curved form, as shown clearly in Fig. 2. To the outer end of this catch or fastening F there is attached a rope, G, which passes over a pulley, H, in the bar D.

I I are two chains, the lower ends of which are attached to the hooks A A—one to each—and the upper ends attached to opposite sides of the bar D, as shown clearly in Fig. 1. The hooks A A may be of steel—that, at least, would be the preferable material. The rod or bar B and bar D may be of iron, and also the hook E and fastening F.

The hoisting-rope is attached to the upper end of the bar D, and the ring C, when disengaged from the hook E, causes the hooks A A to spread apart—a result due to their gravity and the attachment to them of the chains I I. The hooks A A are inserted in the hay and the ring C fitted on the hook E, which is then turned upward and secured in such position by turning down the catch or fastening F, as shown in black. (See more particularly Fig. 2.) The fork and its load is then elevated by means of a horse attached to the hoisting-rope arranged in the usual or any proper way, and the hooks A A will close and clutch firmly the load, which, when elevated to the desired place, is discharged by the attendant pulling the rope G, which draws up the catch or fastening F, and thereby releases the hook E, which falls or drops under the weight of the load on the hooks A and the ring C slips off from the hook, causing the hooks to be suspended from the bar D by the chains only, and consequently spread apart, as shown in red. (See more particularly Fig. 1.)

By this simple arrangement the hooks may be readily loaded, and also readily made to discharge their load, when desired. The invention, it is believed, possesses a decided advantage over the elevating-hooks which cross each other and are connected by a pivot, as in my invention the hooks may be further distended or forced apart and manipulated with far greater facility.

I would remark that the hooks A may, if desired, be made with two or more prongs or tines.

I do not claim broadly the employment or use of pivoted hooks for elevating hay by means of a horse; but I do claim as new and desire to secure by Letters Patent—

The hooks A A, pivoted to the rod or bar B, as shown, in combination with the bar D, provided with the hook E and the catch or fastening F, and connected to the hooks A A by the chains I I, all arranged to operate substantially as and for the purpose specified.

AARON KRATZ.

Witnesses:
SAMUEL SCOTT,
MARTIN TYSON.